(12) United States Patent
Cruz et al.

(10) Patent No.: US 8,442,519 B2
(45) Date of Patent: May 14, 2013

(54) SPECTRUM SHARING BETWEEN AN AIRCRAFT-BASED AIR-TO-GROUND COMMUNICATION SYSTEM AND EXISTING GEOSTATIONARY SATELLITE SERVICES

(75) Inventors: Joseph M. Cruz, Naperville, IL (US); Patrick J. Walsh, Naperville, IL (US); Joseph Alan Tobin, Chicago, IL (US); Tim Joyce, Naperville, IL (US); Yong Liu, Schaumberg, IL (US); Anand K. Chari, Bartlett, IL (US); Ivica Kostanic, Palm Bay, FL (US); Harold Grant Saroka, Ashburn, VA (US)

(73) Assignee: GoGo LLC, Itasca, IL (US)

( * ) Notice: Subject to any disclaimer, the term of this patent is extended or adjusted under 35 U.S.C. 154(b) by 60 days.

(21) Appl. No.: 13/172,539

(22) Filed: Jun. 29, 2011

(65) Prior Publication Data

US 2011/0263199 A1    Oct. 27, 2011

Related U.S. Application Data

(63) Continuation-in-part of application No. 12/137,995, filed on Jun. 12, 2008, which is a continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, application No. 13/172,539, which is a continuation-in-part of application No. 12/423,555, filed on Apr. 14, 2009, now Pat. No. 8,073,443, which is a continuation of application No. 10/730,329, filed on Dec. 7, 2003, now Pat. No. 7,113,780.

(51) Int. Cl.
*H04W 4/00*        (2009.01)

(52) U.S. Cl.
USPC ........... 455/431; 455/464; 455/509; 455/450; 455/451; 455/452.1

(58) Field of Classification Search .................. 455/431, 455/1, 3.02, 12.1, 13.1–13.2, 98, 63.1, 114.2, 455/278.1, 296, 450, 451, 452.1, 464, 509
See application file for complete search history.

(56) References Cited

U.S. PATENT DOCUMENTS

| | | |
|---|---|---|
| 3,659,085 A | 4/1972 | Potter et al. |
| 4,115,777 A | 9/1978 | Taylor |

(Continued)

FOREIGN PATENT DOCUMENTS

| | | |
|---|---|---|
| WO | WO-0146822 A1 | 6/2001 |
| WO | WO-2006128946 A1 | 12/2006 |
| WO | WO-2008048742 A1 | 4/2008 |

OTHER PUBLICATIONS

In the US Patent and Trademark Office in re: U.S. Appl. No. 07/847,920, Final Office Action dated Aug. 22, 1995, No. of pages unknown.

(Continued)

*Primary Examiner* — Wayne Cai
(74) *Attorney, Agent, or Firm* — Patton Boggs LLP

(57) ABSTRACT

The present Spectrum Sharing System implements spectrum reuse between aircraft-based Air-To-Ground (ATG) communication systems and Geostationary Satellite Service systems. This is accomplished by managing the radio frequency transmissions in the volume of space in which the aircraft operates, with interference between the Spectrum Sharing System and the Geostationary Satellite Service system being reduced by implementing reversed uplink and downlink radio frequency paths in the common spectrum. The Spectrum Sharing System also avoids interfering with Geostationary Satellite Services' earth stations which are pointed towards the satellites' orbital arc by relying upon a combination of the earth stations' highly directive antenna patterns and the Spectrum Sharing System ground station antenna pattern, and to avoid interfering with satellites in their orbital arc by assuring that power levels radiated in that direction by the Spectrum Sharing System ground stations are below the level that would create interference.

10 Claims, 6 Drawing Sheets

U.S. PATENT DOCUMENTS

| | | | |
|---|---|---|---|
| 4,654,867 | A | 3/1987 | Labedz et al. |
| 5,042,027 | A | 8/1991 | Takase et al. |
| 5,123,112 | A | 6/1992 | Choate |
| 5,212,804 | A | 5/1993 | Choate |
| 5,408,515 | A | 4/1995 | Bhagat et al. |
| 5,432,841 | A | 7/1995 | Rimer |
| 5,459,469 | A | 10/1995 | Schuchman et al. |
| 5,519,761 | A | 5/1996 | Gilhousen |
| 5,543,779 | A | 8/1996 | Aspesi et al. |
| 5,555,444 | A | 9/1996 | Diekelman et al. |
| 5,590,395 | A | 12/1996 | Diekelman |
| 5,651,050 | A | 7/1997 | Bhagat et al. |
| 5,659,304 | A | 8/1997 | Chakraborty |
| 5,678,174 | A | 10/1997 | Tayloe |
| 5,740,535 | A | 4/1998 | Rune |
| 5,754,959 | A | 5/1998 | Ueno et al. |
| 5,805,683 | A | 9/1998 | Berberich, Jr. |
| 5,822,680 | A * | 10/1998 | Stuart et al. .................. 455/12.1 |
| 5,826,188 | A | 10/1998 | Tayloe et al. |
| 5,832,380 | A | 11/1998 | Ray et al. |
| 5,848,359 | A | 12/1998 | Furtaw |
| 5,887,258 | A | 3/1999 | Lemozit et al. |
| 5,950,129 | A | 9/1999 | Schmid et al. |
| 5,956,644 | A | 9/1999 | Miller et al. |
| 5,995,805 | A | 11/1999 | Ogasawara et al. |
| 5,995,833 | A | 11/1999 | Zicker |
| 6,002,944 | A | 12/1999 | Beyda |
| 6,009,330 | A | 12/1999 | Kennedy, III et al. |
| 6,040,781 | A | 3/2000 | Murray |
| 6,055,425 | A | 4/2000 | Sinivaara |
| 6,104,926 | A | 8/2000 | Hogg et al. |
| 6,144,338 | A | 11/2000 | Davies |
| 6,195,529 | B1 | 2/2001 | Linz et al. |
| 6,263,206 | B1 | 7/2001 | Potochniak et al. |
| 6,263,371 | B1 | 7/2001 | Geagan, III et al. |
| 6,304,762 | B1 | 10/2001 | Myers et al. |
| 6,314,286 | B1 | 11/2001 | Zicker |
| 6,317,435 | B1 | 11/2001 | Tiedemann, Jr. et al. |
| 6,324,398 | B1 | 11/2001 | Lanzerotti et al. |
| 6,353,734 | B1 | 3/2002 | Wright et al. |
| 6,392,692 | B1 | 5/2002 | Monroe |
| 6,393,281 | B1 | 5/2002 | Capone et al. |
| 6,418,327 | B1 | 7/2002 | Carey et al. |
| 6,430,412 | B1 | 8/2002 | Hogg et al. |
| 6,545,601 | B1 | 4/2003 | Monroe |
| 6,546,426 | B1 | 4/2003 | Post |
| 6,567,052 | B1 | 5/2003 | Wang et al. |
| 6,570,851 | B1 | 5/2003 | Koskelainen et al. |
| 6,577,419 | B1 | 6/2003 | Hall et al. |
| 6,580,915 | B1 | 6/2003 | Kroll |
| 6,615,052 | B1 | 9/2003 | Parmenter |
| 6,690,928 | B1 | 2/2004 | Konishi et al. |
| 6,735,438 | B1 | 5/2004 | Sabatino |
| 6,735,500 | B2 | 5/2004 | Nicholas et al. |
| 6,735,633 | B1 | 5/2004 | Welch et al. |
| 6,741,841 | B1 | 5/2004 | Mitchell |
| 6,754,489 | B1 | 6/2004 | Roux |
| 6,757,712 | B1 | 6/2004 | Bastian et al. |
| 6,760,778 | B1 | 7/2004 | Nelson et al. |
| 6,788,935 | B1 | 9/2004 | McKenna et al. |
| 6,799,037 | B1 | 9/2004 | Mielke et al. |
| 6,880,750 | B2 | 4/2005 | Pentel |
| 6,889,042 | B2 | 5/2005 | Rousseau et al. |
| 6,892,068 | B2 * | 5/2005 | Karabinis et al. ............. 455/429 |
| 6,944,169 | B1 | 9/2005 | Yoshizawa et al. |
| 7,050,755 | B2 | 5/2006 | Kline |
| 7,062,268 | B2 | 6/2006 | McKenna |
| 7,107,062 | B2 | 9/2006 | Cruz et al. |
| 7,280,535 | B1 | 10/2007 | Bergman et al. |
| 7,346,677 | B1 | 3/2008 | Mohaban et al. |
| 8,060,083 | B2 | 11/2011 | Malosh |
| 2002/0010633 | A1 | 1/2002 | Brotherston |
| 2002/0045444 | A1 | 4/2002 | Usher et al. |
| 2002/0059614 | A1 | 5/2002 | Lipsanen et al. |
| 2002/0090931 | A1 | 7/2002 | Papineau et al. |
| 2002/0123344 | A1 | 9/2002 | Criqui et al. |
| 2002/0155833 | A1 | 10/2002 | Borel |
| 2003/0032426 | A1 | 2/2003 | Gilbert et al. |
| 2003/0046701 | A1 | 3/2003 | O'Donnell |
| 2003/0050746 | A1 | 3/2003 | Baiada et al. |
| 2003/0055975 | A1 | 3/2003 | Nelson et al. |
| 2003/0084108 | A1 | 5/2003 | Syed |
| 2003/0093187 | A1 | 5/2003 | Walker |
| 2003/0103521 | A1 | 6/2003 | Raphaeli et al. |
| 2004/0063433 | A1 | 4/2004 | Garrison |
| 2004/0102156 | A1 * | 5/2004 | Loner .......................... 455/12.1 |
| 2004/0137840 | A1 | 7/2004 | La Chapelle et al. |
| 2004/0142658 | A1 | 7/2004 | McKenna et al. |
| 2004/0203918 | A1 | 10/2004 | Moriguchi et al. |
| 2005/0053026 | A1 | 3/2005 | Mullan et al. |
| 2005/0071076 | A1 | 3/2005 | Baiada et al. |
| 2005/0216938 | A1 | 9/2005 | Brady et al. |
| 2005/0221875 | A1 | 10/2005 | Grossman et al. |
| 2006/0009262 | A1 | 1/2006 | Hamm |
| 2006/0048196 | A1 | 3/2006 | Yau |
| 2006/0064746 | A1 | 3/2006 | Aaron et al. |
| 2006/0199532 | A1 | 9/2006 | Soliman |
| 2007/0021117 | A1 | 1/2007 | McKenna et al. |
| 2007/0042772 | A1 | 2/2007 | Salkini et al. |
| 2007/0064604 | A1 | 3/2007 | Chen et al. |
| 2007/0087756 | A1 | 4/2007 | Hoffberg |
| 2007/0105600 | A1 | 5/2007 | Mohanty et al. |
| 2007/0161347 | A1 | 7/2007 | Ma et al. |
| 2007/0274294 | A1 | 11/2007 | Sasaki et al. |
| 2007/0281682 | A1 | 12/2007 | Raju et al. |
| 2008/0070601 | A1 | 3/2008 | Brueckheimer et al. |
| 2008/0090546 | A1 | 4/2008 | Dickinson et al. |
| 2008/0274734 | A1 | 11/2008 | Kostanic et al. |
| 2009/0016339 | A1 | 1/2009 | Tanizawa et al. |
| 2010/0013703 | A1 * | 1/2010 | Tekawy et al. ........... 342/357.03 |

OTHER PUBLICATIONS

In the US Patent and Trademark Office in re: U.S. Appl. No. 07/847,920, Final Office Action dated Mar. 21, 1996, No. of pages unknown; and corresponding response dated Mar. 27, 1996, No. of pages unknown.

In the US Patent and Trademark Office in re: U.S. Appl. No. 07/847,920, Non-Final Office Action dated Feb. 27, 1995, No. of pages unknown; and corresponding response dated May 24, 1995, No. of pages unknown.

In the US Patent and Trademark Office in re: U.S. Appl. No. 07/847,920, Non-Final Office Action dated Jan. 27, 1994, No. of pages unknown; and corresponding response dated May 31, 1994, No. of pages unknown; and supplemental response dated Sep. 20, 1994, No. of pages unknown.

In the US Patent and Trademark Office in re: U.S. Appl. No. 07/847,920, Non-Final Office Action dated Jul. 30, 1993, No. of pages unknown; and corresponding response dated Oct. 26, 1993, No. of pages unknown.

In the US Patent and Trademark Office in re: U.S. Appl. No. 08/027,333, Non-Final Office Action dated Jun. 24, 1994, No. of pages unknown; and corresponding response dated Dec. 22, 1994, No. of pages unknown.

In the US Patent and Trademark Office in re: U.S. Appl. No. 08/709,417, Final Office Action dated Jun. 11, 1998, No. of pages unknown; and corresponding response dated Aug. 3, 1998, No. of pages unknown.

In the US Patent and Trademark Office in re: U.S. Appl. No. 08/709,417, Non-Final Office Action dated Feb. 18, 1998, No. of pages unknown; and corresponding response dated Apr. 20, 1998, No. of pages unknown.

In the US Patent and Trademark Office in re: U.S. Appl. No. 08/960,183, Non-Final Office Action dated Nov. 5, 1999, No. of pages unknown.

In the US Patent and Trademark Office in re: U.S. Appl. No. 08/960,183, Non-Final Office Action dated Nov. 5, 1999, No. of pages unknown; and corresponding response dated Dec. 6, 1999, No. of pages unknown.

In the US Patent and Trademark Office in re: U.S. Appl. No. 09/379,825, Non-Final Office Action dated May 11, 2001, No. of pages unknown; and corresponding response dated May 29, 2001, No. of pages unknown.

In the US Patent and Trademark Office in re: U.S. Appl. No. 09/686,923, Final Office Action dated Dec. 2, 2003, No. of pages unknown; and corresponding response dated Jan. 9, 2004, No. of pages unknown; and supplemental response dated Feb. 20, 2004, No. of pages unknown.
In the US Patent and Trademark Office in re: U.S. Appl. No. 09/686,923, Non-Final Office Action dated Jul. 8, 2003, No. of pages unknown; and corresponding response dated Sep. 29, 2003, No. of pages unknown.
In the US Patent and Trademark Office in re: U.S. Appl. No. 10/730,329, Final Office Action dated Nov. 25, 2005, 16 pages; and corresponding response dated Jan. 25, 2006, 32 pages; supplemental response dated Feb. 17, 2006, 31 pages; supplemental response dated Feb. 17, 2006, 28 pages; supplemental response dated Mar. 27, 2006, 21 pages; and supplemental response dated Apr. 14, 2006, 21 pages.
In the US Patent and Trademark Office in re: U.S. Appl. No. 10/730,329, Final Office Action dated Nov. 25, 2005, 16 pages; corresponding response dated Jan. 25, 2006, 32 pages; supplemental response dated Feb. 17, 2006, 31 pages; additional supplemental response dated Mar. 27, 2006, 21 pages; and additional supplemental response with RCE dated Apr. 14, 2006, 21 pages.
In the US Patent and Trademark Office in re: U.S. Appl. No. 10/730,329, Non-Final Office Action dated May 18, 2005, 9 pages; and corresponding response dated Aug. 18, 2005, 34 pages.
In the US Patent and Trademark Office in re: U.S. Appl. No. 11/492,545, Final Office Action dated Dec. 19, 2008, 18 pages; and corresponding response dated Jan. 27, 2009, 34 pages; and supplemental response dated Apr. 17, 2009, 35 pages.
In the US Patent and Trademark Office in re: U.S. Appl. No. 11/492,545, Final Office Action dated Nov. 19, 2009, 19 pages; and corresponding response dated Feb. 9, 2010, 15 pages.
In the US Patent and Trademark Office in re: U.S. Appl. No. 11/492,545, Non-Final Office Action dated Aug. 7, 2008, 19 pages; and corresponding response dated Oct. 10, 2008, 29 pages.
In the US Patent and Trademark Office in re: U.S. Appl. No. 11/492,545, Non-Final Office Action dated Jun. 10, 2009, 20 pages; and corresponding response dated Sep. 3, 2009, 32 pages.
In the US Patent and Trademark Office in re: U.S. Appl. No. 11/590,146, Final Office Action dated Mar. 31, 2009, 9 pages; and corresponding response dated May 29, 2009, 16 pages.
In the US Patent and Trademark Office in re: U.S. Appl. No. 11/590,146, Non-Final Office Action dated Sep. 24, 2008, 12 pages; and corresponding response dated Jan. 29, 2009, 13 pages.
In the US Patent and Trademark Office in re: U.S. Appl. No. 12/021,133, Non-Final Office Action dated Jun. 18, 2009, 14 pages; and corresponding response dated Sep. 9, 2009, 19 pages.
In the US Patent and Trademark Office in re: U.S. Appl. No. 12/137,995, Non-Final Office Action dated Jul. 27, 2011, 14 pages.
In the US Patent and Trademark Office in re: U.S. Appl. No. 12/182,834, Final Office Action dated Nov. 20, 2009, 8 pages.
In the US Patent and Trademark Office in re: U.S. Appl. No. 12/182,834, Non-Final Office Action dated Feb. 8, 2011, 8 pages.
In the US Patent and Trademark Office in re: U.S. Appl. No. 12/182,834, Non-Final Office Action dated Jul. 8, 2009, 13 pages; and response dated Sep. 14, 2009, 11 pages.
Casewell, I.E.; "The Provision of GSM Cellular Radio Environments With Passenger Aircraft Operating Over Europe"; IEEE Fifth International Conference; Dec. 11-14, 1989; pp. 172-176.
International Search Report issued Jul. 17, 2009 in co-pending application PCT/US2009/042788.
Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation of Land Mobile Systems for Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.
In the US Patent and Trademark Office in re: U.S. Appl. No. 11/590,146, Final Office Action dated Mar. 15, 2009, 18 pages.
In the US Patent and Trademark Office in re: U.S. Appl. No. 11/590,146, Non-Final Office Action dated Sep. 15, 2009, 16 pages.
In the US Patent and Trademark Office in re: U.S. Appl. No. 12/060,645, Non-Final Office Action dated Jul. 2, 2012, 10 pages.
In the US Patent and Trademark Office in re: U.S. Appl. No. 12/137,995, Final Office Action dated Nov. 30, 2011, 17 pages.
In the US Patent and Trademark Office in re: U.S. Appl. No. 13/009,579, Final Office Action dated Jul. 3, 2012, 7 pages.
In the US Patent and Trademark Office in re: U.S. Appl. No. 13/009,579, Non-Final Office Action dated Feb. 23, 2012, 6 pages.
In the US Patent and Trademark Office in re: U.S. Appl. No. 13/009,687, Final Office Action dated Jul. 17, 2012, 8 pages.
In the US Patent and Trademark Office in re: U.S. Appl. No. 13/009,687, Non-Final Office Action dated Feb. 22, 2012, 5 pages.
In the US Patent and Trademark Office in re: U.S. Appl. No. 13/224,564, Non-Final Office Action dated Apr. 2, 2012, 8 pages.
In the US Patent and Trademark Office in re: U.S. Appl. No. 13/227,634, Final Office Action dated Mar. 6, 2012, 7 pages.
In the US Patent and Trademark Office in re: U.S. Appl. No. 13/227,634, Non-Final Office Action dated Nov. 29, 2011, 13 pages.
International Search Report issued Aug. 24, 2012, in co-pending application PCT/US2012/044266, 5 pages.
International Search Report issued Mar. 21, 2012, in co-pending application PCT/US2011/068110, 4 pages.
Nia et al.; "High Altitude Platform System (HAPS) and Co-existence with Fixed Satellite Service (FSS) in Frequency Range 5850-7075 MHz," *Wireless Communication, Vehicular Technology, Information Theory and Aerospace & Electronic Systems Technology (Wireless Vitae)*, 2011 2nd International Conference, 2011; pp. 1-6.

* cited by examiner

SPECTRUM SHARING BETWEEN AN AIRCRAFT-BASED AIR-TO-GROUND COMMUNICATION SYSTEM AND EXISTING GEOSTATIONARY SATELLITE SERVICES

FIELD OF THE INVENTION

This invention relates to Air-To-Ground (ATG) communications and, in particular, to a communication system that provides communication devices, which are served by a communication network located on an aircraft, with high speed Air-To-Ground communications service by the reuse of the radio frequency spectrum presently used by Geostationary Satellite Services extant in the volume of space in which the aircraft operates.

BACKGROUND OF THE INVENTION

It is a problem in the field of Air-To-Ground (ATG) communications, such as between aircraft and ATG ground stations, to provide sufficient bandwidth to carry the communications between the communication devices, which are served by a communication network (wired or wireless) located on the aircraft, and ATG ground stations which are connected to terrestrial communication networks. The collection of ATG ground stations used for this purpose implement a traditional cellular network, with each ATG ground station consisting of a "cell site." There are limited choices of spectrum which are available for this purpose, which choices are also limited by the ability to implement the corresponding radio frequency antennas on the aircraft.

The typical ATG cellular communications network consists of a number of terrestrial (ground) ATG base stations, each of which provides a radio frequency coverage area in a predetermined volume of space, radially arranged around the cell site transmitting and receiving antennas. This terrestrial base station uses antenna patterns which are less sensitive to the reception of ground-originating or ground-reflected signals and which antenna patterns are primarily focused on the area between the horizon and zenith. The terrestrial base stations are geographically distributed, generally following a typical cellular communications network layout. Terrestrial base stations can also be co-located near airports to enable network coverage when aircraft are on the ground; in this case, the antenna patterns are optimized for terrestrially-located aircraft. The boundaries of the coverage area of each terrestrial base station are substantially contiguous with that of neighboring sites so that the composite coverage of all of the terrestrial base stations in the ATG cellular communications network generally provides coverage over the targeted area. Terrestrial base stations may provide either a single omni-cell of coverage using transceiver(s) associated with a single transmit-and-receive antenna system or multiple sectors within the area of coverage of the site, each with associated transceivers and the associated transmit-and-receive antennas. The advantage of the latter arrangement, with multiple sectors per terrestrial base station, is to allow provision of increased call and data traffic handling capacity in the coverage area of that terrestrial base station.

The present radio frequency spectrum which is available for this purpose limits the total available traffic handling capacity in any single cell. Thus, the radio frequency communications link between the aircraft and the terrestrial base stations of the ATG cellular communications network has limited capacity and, as passengers utilize the aircraft network for Internet browsing and broadband file downloads, the channel capacity becomes exhausted before the demand is served in its entirety. More advantageous spectrum choices are presently unavailable, because they are dedicated for pre-existing uses, such as satellite communications.

BRIEF SUMMARY OF THE INVENTION

The above-described problems are solved and a technical advance achieved in the field by the present Spectrum Sharing Between An Aircraft-Based Air-To-Ground Communication System And Existing Geostationary Satellite Services (termed "Spectrum Sharing System" herein) which implements spectrum reuse between aircraft-based Air-To-Ground (ATG) communication systems and Geostationary Satellite Service systems. This is accomplished by managing the radio frequency transmissions in the volume of space in which the aircraft operates, with interference between the Spectrum Sharing System and the Geostationary Satellite Service system being reduced by implementing reversed uplink and downlink radio frequency paths in the common spectrum. The Spectrum Sharing System also avoids interfering with Geostationary Satellite Services' earth stations which are pointed towards the satellites' orbital arc by relying upon a combination of the earth stations' highly directive antenna patterns and the Spectrum Sharing System ground station antenna pattern, and to avoid interfering with satellites in their orbital arc by assuring that power levels radiated in that direction by the Spectrum Sharing System ground stations are below the level that would create interference.

The present Spectrum Sharing System thereby provides increased bandwidth to provide communication devices, which are served by a communication network located on an aircraft, with high speed Air-To-Ground communications service, since the selected frequencies provide greater bandwidth than those presently in use in ATG communications or can be used to supplement the ATG frequencies presently in use. Interference between the Spectrum Sharing System and the Geostationary Satellite Service system is reduced by implementing reversed uplink and downlink radio frequency paths in the common spectrum. Furthermore, one of the conditions for mitigation of interference between the two systems is that the transmission of the Spectrum Sharing System ground station is outside of the main beams of the Geostationary Satellite Service earth station antennas. This means that, in the Northern Hemisphere, the Spectrum Sharing System ground station needs to be transmitting in a southerly direction into the back lobe of the earth station antenna of the Geostationary Satellite Service system, which is transmitting in a southerly direction toward the Geostationary satellites; and in the Southern Hemisphere, the Spectrum Sharing System ground station needs to be transmitting in the northerly direction into the back lobe of the earth station antenna of the Geostationary Satellite Service system, which is transmitting in a northerly direction toward the Geostationary satellites.

DETAILED DESCRIPTION OF THE INVENTION

Figure 5:
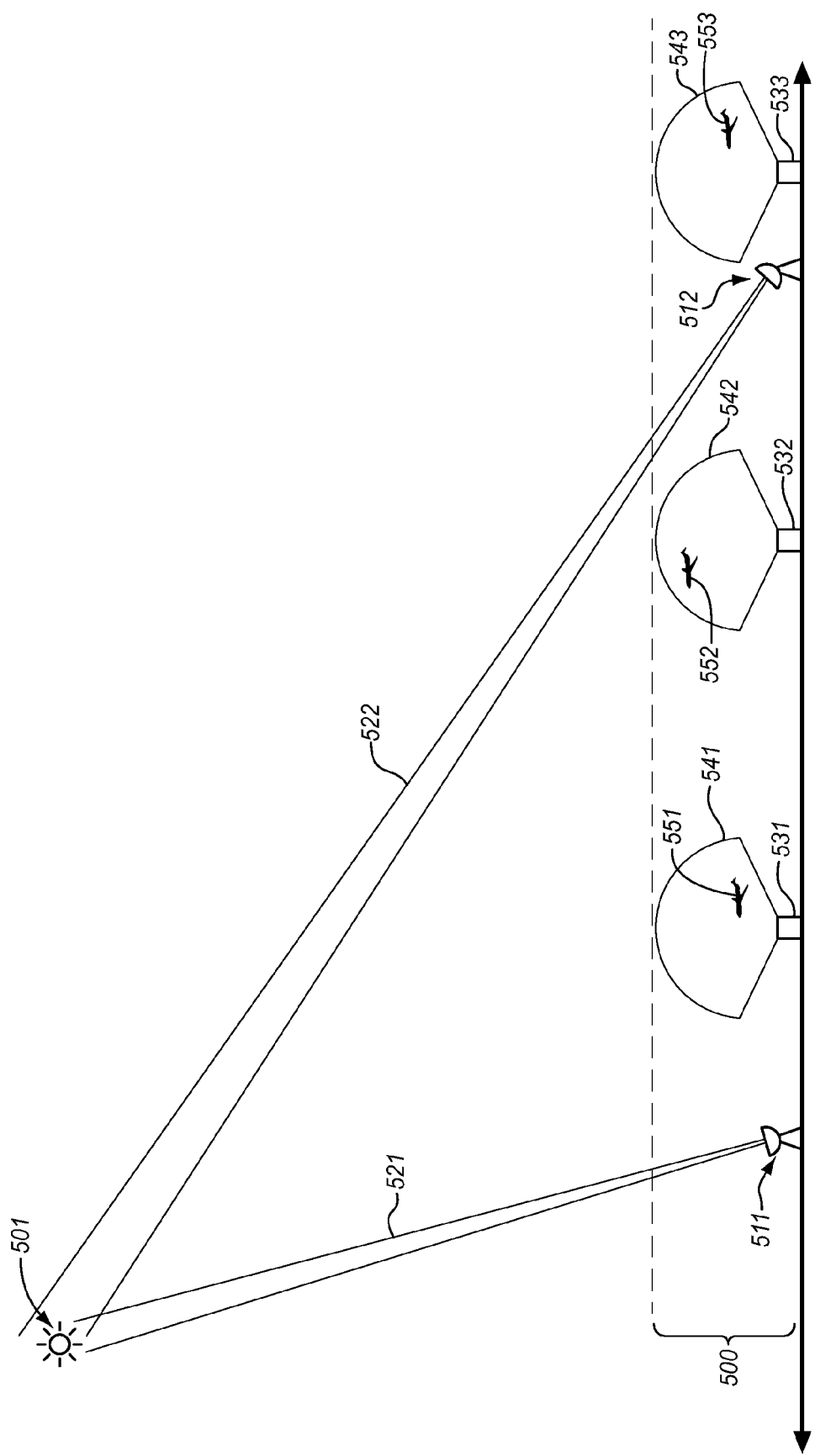
FIG. 5 illustrates the orientation of Shared Spectrum System ground stations and aircraft in relation to Geostationary Satellite Service earth stations.

As shown in FIG. 5, a satellite 501 in a geostationary orbit appears to be in a fixed position to an earth-based observer. A geostationary satellite 501 revolves around the earth at a constant speed once per day over the equator, thus matching the speed of rotation of the earth and appearing stationary relative to any point on the earth's surface. The geostationary orbit is useful for communications applications because earth station antennas 511, 512, which must be directed toward satellite 501, can operate effectively without the need for expensive equipment to track the satellite's motion. Since geostationary satellites are constrained to operate above the equator, a geostationary satellite appears low on the horizon to the earth station antennas when i) earth stations are near the easternmost or westernmost coverage limits of a satellite; or ii) when earth stations are at high latitudes. For most earth stations operating within the continental US, the geostationary satellite is 20° to 50° above the horizon; and the beam width of antennas is sufficiently narrow (on the order of 2° or less) to avoid ground reflections and interference between satellites.

Radio Frequency Spectrum Sharing Plan

Figure 1:
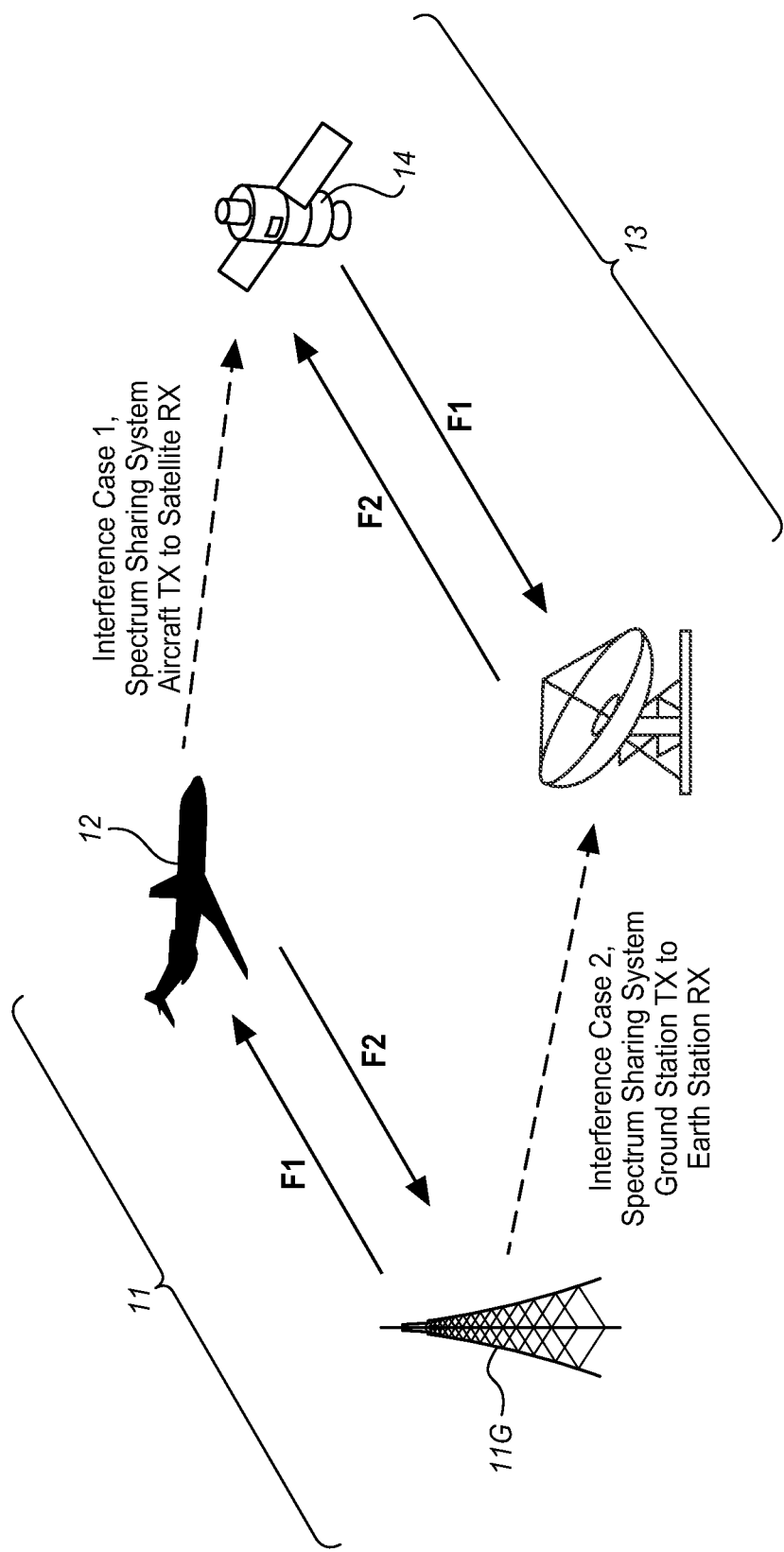
FIG. 1 illustrates a graphic representation of the radio frequency spectrum sharing plan, between Air-To-Ground systems and satellite based systems, which is implemented by the present Spectrum Sharing System.

FIG. 1 illustrates a graphic representation of an illustrative embodiment of the radio frequency spectrum sharing plan, between the present Spectrum Sharing System 11 and Geostationary Satellite Service system 13, to provide communications services to communication devices (not shown) which are located onboard aircraft 12. In the present Spectrum Sharing System 11, uplink transmissions from Spectrum Sharing System ground stations 11G to aircraft 12 use an existing satellite downlink frequency band F1 (and optionally the existing satellite uplink frequency band F2 and optionally the existing ATG frequency band), while downlink transmissions from aircraft 12 to Spectrum Sharing System ground stations 11G use an existing satellite uplink frequency band F2 (and optionally the existing ATG frequency band). The two systems (Spectrum Sharing System 11 and Geostationary Satellite Service system 13) are co-spectrum, and there exists a possibility for mutual interference which may be in both the uplink and downlink directions. There are four possibilities for interference:
  1. From the Spectrum Sharing System Aircraft transmitter (not shown, but located in aircraft 12) to the Geostationary Satellite Service system satellite receiver;
  2. From the Spectrum Sharing System ground station transmitter to the Geostationary Satellite Service system earth station receiver;
  3. From the Geostationary Satellite Service system earth station transmitter to the Spectrum Sharing System ground station receiver; and
  4. From the Geostationary Satellite Service system satellite transmitter to the Spectrum Sharing System Aircraft receiver (not shown, but located in aircraft 12).

Interference from the Spectrum Sharing System 11 to the Geostationary Satellite Service system 13 is more significant than the interference in the opposite direction due to the differences in signal power and the highly directional antenna patterns used in the Geostationary Satellite Service system 13. There are two primary cases of this interference between Spectrum Sharing System 11 and Geostationary Satellite Service system 13 as is illustrated in FIG. 1. Case 1 illustrated in FIG. 1 is interference from the Spectrum Sharing System aircraft transmitter at frequency F2 to the satellite receiver 13 of the Geostationary Satellite Service system 13, and Case 2 illustrated in FIG. 1 is interference from Spectrum Sharing System ground station 11G transmitter at frequency F1 to the Geostationary Satellite Services earth station 13G receiver.

Interference Between Spectrum Sharing System and the Geostationary Satellite Service The interference in Case 1, where the aircraft radio frequency transmissions on frequency F2 interfere with the satellite received radio frequency signals, is relatively low. On the ground, Geostationary Satellite Service signals on frequency F1 are extremely weak unless received by an accurately pointed high gain antenna, such as that used by the earth station 13G of the Geostationary Satellite Service system 13. Geostationary Satellite Service earth station antennas are usually high gain antennas that radiate only through a very narrow beam upwardly directed toward the satellite 14 with which the Geostationary Satellite Service earth station 13G communicates. With a minimum precaution in the location of the Spectrum Sharing System ground stations 11G, this interference can be easily avoided.

Figure 6:
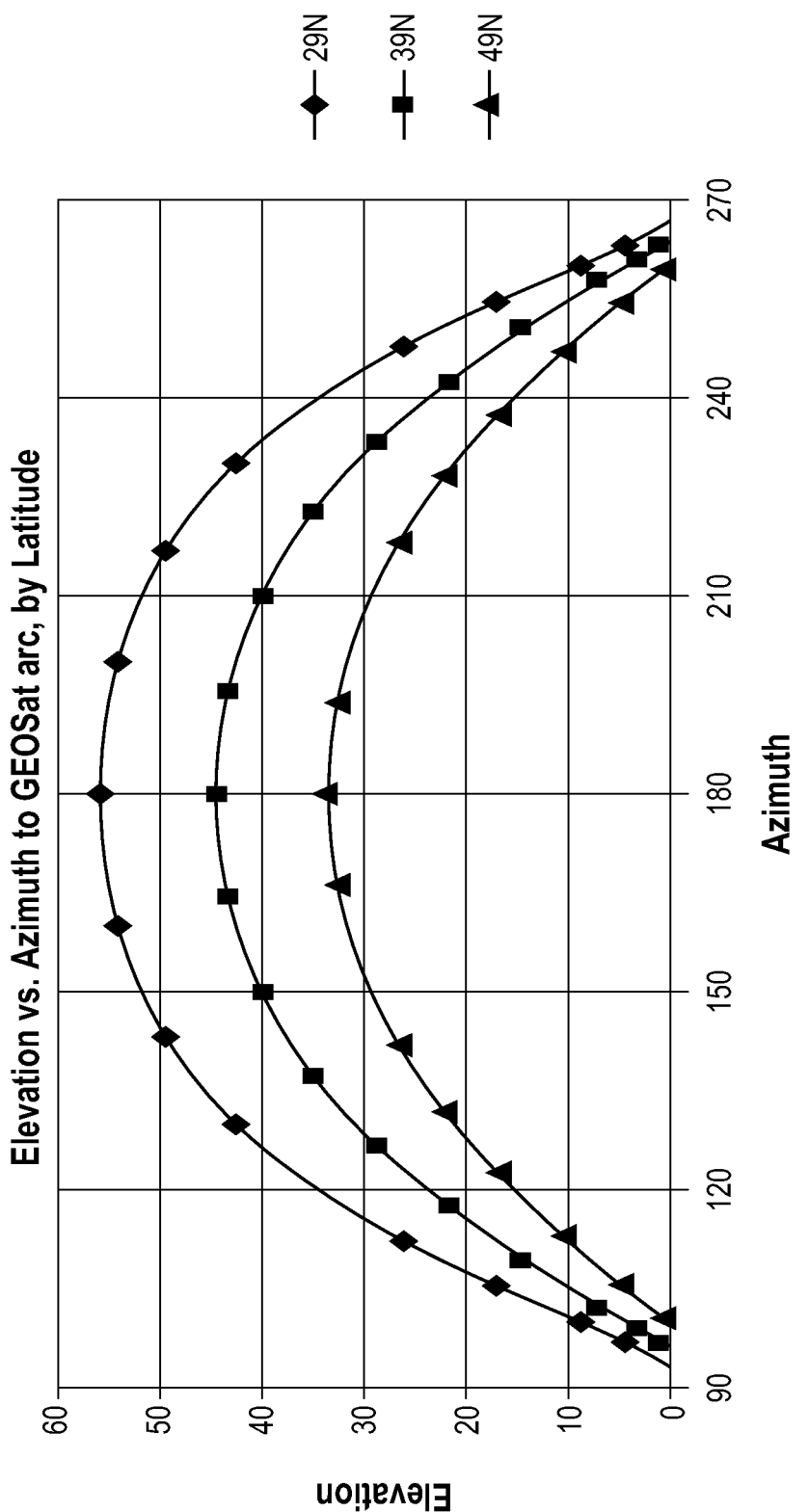
FIG. 6 illustrates the antenna pointing angle from the Geostationary Satellite Service system is in a southerly direction, ranging from a low azimuth angle for Geostationary Satellite Service earth stations in the northern extent of the coverage area to a high azimuth angle for Geostationary Satellite Service earth stations in the southern extent of the coverage area.

FIG. 5 illustrates the orientation (but not drawn to scale) of a plurality of Shared Spectrum System ground stations 531-533 (which are but a few of those that are necessary to provide complete coverage of the service area which consists of the region of space 500 between the earth surface and the maximum altitude at which the aircraft are operational) and aircraft 551-553 in relation to Geostationary Satellite Service geo-synchronous satellites 500 and earth stations 511-512. As can be seen from this figure, the antenna beam 521-522 for the Geostationary Satellite Service earth station antennas 511-512 is narrow in extent and upwardly directed at the orbital arc of the selected geosynchronous satellites 500 located above the equator. The antenna pointing angle from the Geostationary Satellite Service system 13 is in a southerly direction, ranging from a low azimuth angle for earth stations 512 in the northern extent of the coverage area to a high azimuth angle for earth stations 511 in the southern extent of the coverage area, as illustrated in FIG. 6. In contrast, the Shared Spectrum System antenna beams 541-543, while also upwardly pointing and generally pointing towards just above the horizon, are broad in extent. The primary interference mode constitutes the Shared Spectrum System antenna beams 541-543 being received by the Geostationary Satellite Service earth station 511-512 antennas. Therefore, radio frequency transmission management requires:
  "Southerly" pointing of the Spectrum Sharing System ground station antennas for signals at low elevation angles, with any northern facing signals at angles well above the horizon. This way, the Spectrum Sharing System ground station transmission is outside of the main beams for the Fixed Satellite Service earth station receiver antennas. The limits of the coverage of the Spectrum Sharing System antennas at any particular latitude are governed by the range of azimuth angles to the orbital arc, as illustrated in FIG. 5, with a small additional allowance for the maximum beamwidth of the earth station receive antennas.

To maintain low power spectral density on the Spectrum Sharing System ground station transmission, the signal may need to be spread over a large portion of spectrum. Fortunately, several satellites bands provide hundreds of MHz of spectrum, which is sufficient to reduce spectral density to sufficiently low levels while maintaining high data rates from the ground to the aircraft.

From the interference mitigation standpoint, use of antennas with highly discriminating patterns on both ends of the Spectrum Sharing System spectrum would be highly beneficial. Additional techniques that may be used for interference mitigation are:

1. Placement of the Spectrum Sharing System ground stations;
2. Antenna patterns of the Spectrum Sharing System ground stations, including beam forming and beam steering;
3. Signal spreading;
4. Power control; and
5. Active interference cancelation in case of beam steering.

Evaluation of the Ground Station Transmission to Earth Station Receiver

Figure 3:
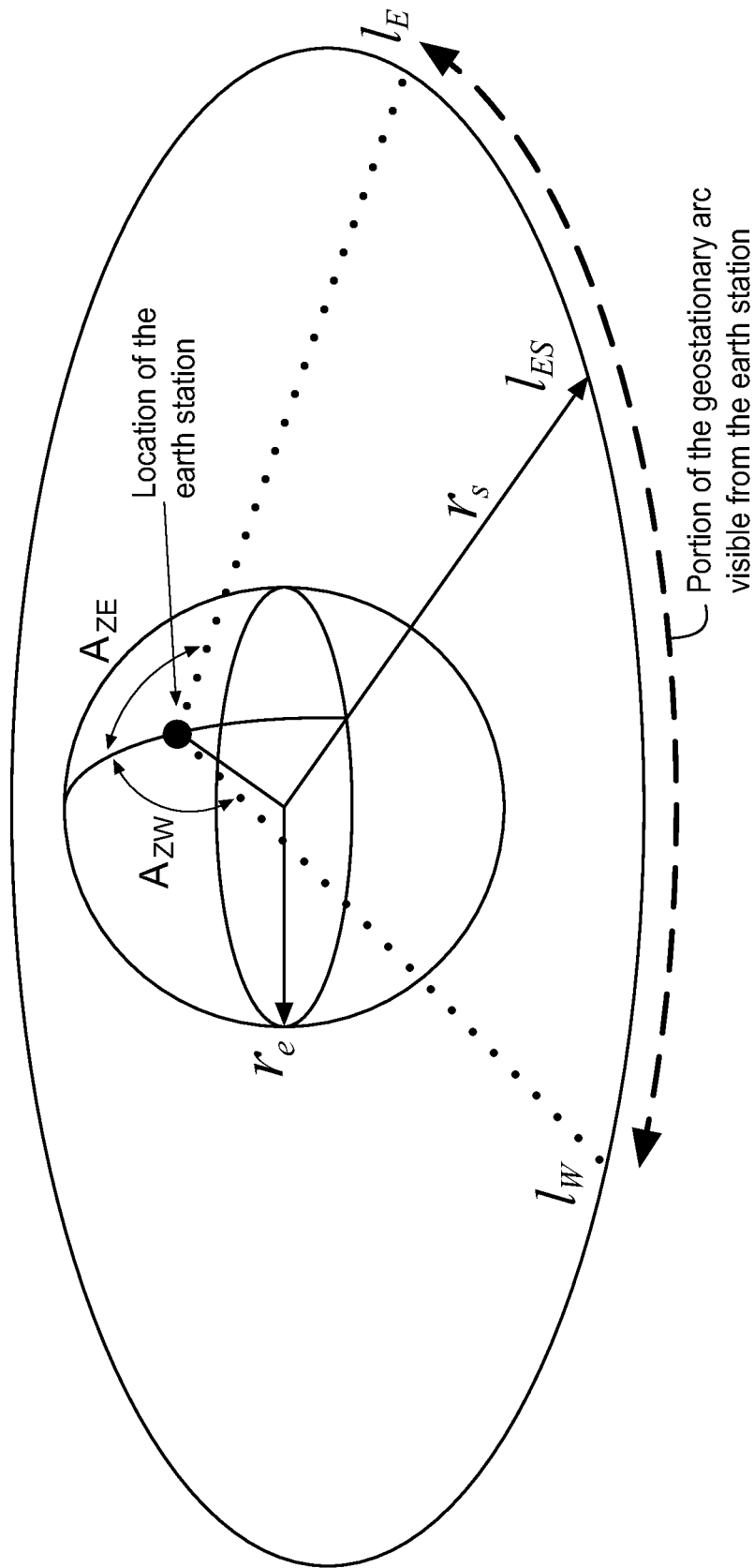
FIG. 3 illustrates, in graphical form, the portion of a geostationary arc visible from the location of an earth station.

As an example, when viewed from the continental US, the orbit of a geostationary satellite is in a southerly direction. All of the Geostationary Satellite Service earth station antennas, therefore, are pointing towards the south. Depending on the latitude of the earth station, only a portion of the geostationary arc of the satellite is visible. The situation is illustrated in FIG. 3. For any given geographical location of the earth station, there are two longitudes that limit the visible portion of the geostationary arc, which are labeled as $l_E$ and $l_W$. Therefore, the antenna of the earth station always points to some location on the visible portion of this geostationary arc. As the latitude of the earth station increases towards north, the portion of the visible arc becomes smaller. For earth stations that are above ~80° north, the geostationary orbit is not visible.

Consider an earth station at the latitude/longitude location given by a pair of coordinates ($L_{ES}, l_{ES}$). Coordinate $L_{ES}$ is the earth station latitude, while $l_{ES}$ is the earth station longitude. Using simple geometry, one can easily demonstrate the following relationships:

$$l_E = l_{ES} - \cos^{-1}\left(\frac{r_e}{r_s \cos(L_{ES})}\right) \quad (1)$$

$$l_W = l_{ES} + \cos^{-1}\left(\frac{r_e}{r_s \cos(L_{ES})}\right) \quad (2)$$

$$A_{ZE} = Y \quad (3)$$

$$A_{ZW} = 360° - Y \quad (4)$$

where $$Y = \tan^{-1}\left(\frac{\sin(.5 L_{ES})}{\tan(|l_E - L_{ES}|)\cos(0.5 L_{ES})}\right) + \tan^{-1}\left(\frac{\cos(.5 L_{ES})}{\tan(|l_E - L_{ES}|)\sin(0.5 L_{ES})}\right). \quad (5)$$

Quantities $A_{ZE}$ and $A_{ZW}$ are azimuth angles from the earth station towards far east and far west points on the visible portion of the geostationary arc. These two angles provide maximum theoretical range of directions where the earth station antenna may point. In practical scenarios, the range is always narrower than what is provided by equations (3) and (4).

As an illustration, Table 1 provides values for $l_E$, $l_W$, $A_{ZE}$, and $A_{ZW}$ for two earth stations. The first one is located in Melbourne, Fla., while the second one is in Chicago, Ill. In the Melbourne area, the azimuth for the earth station antennas must fall within the range of from 95.51° to 273.49°. For the Chicago earth stations, the pointing range extends from 99.33° to 269.67°.

TABLE 1

Geostationary Satellite visible from two locations in the continental US

|  | Melbourne, Florida | Chicago, Illinois |
|---|---|---|
| Latitude (deg) | 28.0628 | 41.9978 |
| Longitude (deg) | 80.6231 | 87.6831 |
| $l_E$ (deg, W) | 2.21 | 11.48 |
| $l_W$ (deg, W) | 159.04 | 163.89 |
| Length of the arc (deg) | 78.42 | 76.21 |
| Azimuth to far east point $A_{ZE}$ (deg) | 95.51 | 99.33 |
| Azimuth to far west point $A_{ZW}$ (deg) | 273.49 | 269.67 |

Figure 4:
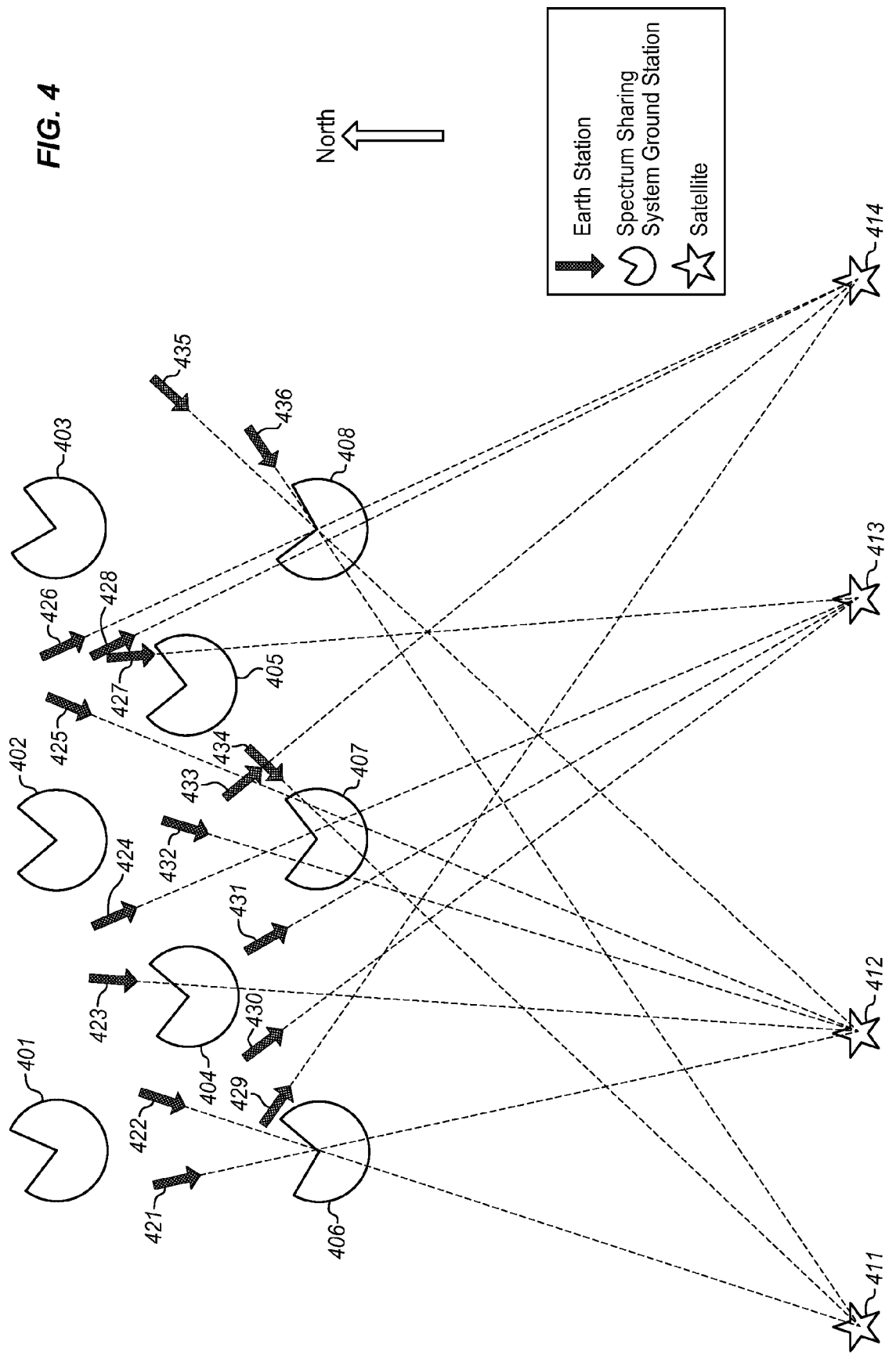
FIG. 4 illustrates, in graphical form, the required conditions for Air-To-Ground transmission outside of the main lobe of earth station antennas.

Referring back to the radio frequency reuse scenario presented in FIG. 1, it is evident that one of the conditions for mitigation of interference between the two systems is that the radio frequency transmission of the Spectrum Sharing System ground station is outside of the main beams of the earth station antennas. This means that the Spectrum Sharing System ground station needs to be transmitting towards the south within the range of azimuth angles as specified by equations (3) and (4) (with small additional reductions as required to avoid the beamwidth of the earth station antennas). This way, the signal from the Spectrum Sharing System ground stations is in the back lobe of the Geostationary Satellite Service earth station antenna. FIG. 4 illustrates, in graphical form, the required conditions for the Spectrum Sharing System uplink transmission outside of the main lobe of the Geostationary Satellite Service earth station antennas.

The power spectrum density of the interference from the Spectrum Sharing System ground station transmission at the back lobe of the earth station antenna may be calculated as:

$$S_I = S_{ATG} G_{ATG}(\theta) - PL_{dB} = EiRP/W - PL_{dB} \quad (6)$$

One may assume that the impact of the Spectrum Sharing System ground station transmission becomes negligible when the $S_I$ in equation (6) falls below the noise floor by a certain threshold. That is:

$$EiRP/W[dBm/MHz] \leq 10 \log(kT) + PL_{dB} - T_{dB} + 90 \quad (7)$$

Table 2 is generated using equation (7) and assuming $T_{dB} = 3$ dB. The table specifies the maximum Effective Isotropic Radiated Power (EiRP) per MHz allowed for the ground-to-air transmission. The use of the table is illustrated through a following simple example.

Consider a Spectrum Sharing System ground station in a location that is 20 km away from the closest Geostationary Satellite Service earth station. The allowed ground station power spectrum density is 23 dBm/MHz (i.e., 200 mW/MHz). Assuming the Spectrum Sharing System uplink operation is 20 MHz of the spectrum, the overall EiRP is 36.04 dBm (4 W).

TABLE 2

Limit on the uplink EiRP in dBm/MHz[*]

| d [km] | Path loss [dB] | EiRP/W [dBm/MHz] | EiRP [dBm] | EiRP [W] |
|---|---|---|---|---|
| 1 | 113.99 | −2.99 | 10.02 | 0.01 |
| 5 | 127.97 | 10.99 | 24.00 | 0.25 |
| 10 | 133.99 | 17.01 | 30.02 | 1.00 |
| 15 | 137.51 | 20.53 | 33.54 | 2.26 |
| 20 | 140.01 | 23.03 | 36.04 | 4.02 |
| 25 | 141.95 | 24.97 | 37.98 | 6.28 |
| 30 | 143.53 | 26.55 | 39.56 | 9.04 |
| 35 | 144.87 | 27.89 | 40.90 | 12.31 |
| 40 | 146.03 | 29.05 | 42.06 | 16.08 |

[*]The EiRP values are calculated assuming 20 MHz channel

Based on Table 2, the allowed power spectral density for Spectrum Sharing System uplink transmission is relatively low. The table assumes that there is no additional attenuation from the back lobe of the earth station antennas. Also, the table is derived assuming no discrimination from the Spectrum Sharing System ground station antenna. In the practical implementation, these additional factors should be evaluated on the basis of required data rates and Spectrum Sharing System cell site link budgets.

FIG. 4 illustrates, in graphical form, the required conditions for Spectrum Sharing System uplink transmissions to be outside of the main lobe of the Geostationary Satellite Service earth station antennas. In particular, Geostationary Satellite Service earth stations 421-436 are shown with their respective antenna beams pointing toward satellites 411-414 of FIG. 4. For the Spectrum Sharing System ground stations 401-408 not to transmit into the receiver antennas at the Geostationary Satellite Service earth stations 421-436, their antenna beams should be oriented as shown in FIG. 4 to prevent the near-earth surface portion of the beam (i.e. the southern portion of the beam) from being received by the main lobe of the Geostationary Satellite Service earth stations 421-436. This is not unduly limiting, since the antenna pattern generated by the Shared Spectrum System antennas are broad three-dimensional shapes and can be managed to avoid the near-ground portions of the pattern in the direction of any nearby Geostationary Satellite Service earth stations 421-436 that are generally north of the ground stations. This does not affect the upwardly pointing segment of the antenna pattern from the Shared Spectrum System antennas.

Evaluation of the Interference from Aircraft-Based Transmissions to the Satellite Receiver From the standpoint of the satellite receiver, the energy transmitted from the Spectrum Sharing System aircraft adds to the noise temperature of the satellite receiver antenna. The satellite receiver antenna is pointing toward the earth, which has a nominal noise temperature of 290K. Therefore, as long as the power spectrum density produced by the Spectrum Sharing System aircraft transmission is significantly smaller than the power spectrum density of the thermal noise generated by the earth's radiation, the impact of the spectrum sharing is negligible. The power spectral density of the Spectrum Sharing System aircraft transmission depends on the EiRP of the aircraft, the bandwidth of the Spectrum Sharing System service, and the number of aircraft that are operating at any given time within the main beam of the satellite antenna.

The power spectral density of the thermal noise received by the satellite antenna may be calculated as:

$$N_0 = kT_E \quad (8)$$

$$= 1.38 \times 10^{-23} \frac{W}{Hz \cdot K} \cdot 290 \text{ K}$$

$$= 4 \times 10^{-21} \frac{W}{Hz} \rightarrow -204 \text{ dBW/Hz}$$

The power spectral density of the interference to the satellite receiver that is caused by the transmission from the Spectrum Sharing System aircraft may be estimated as:

$$N_A = \frac{n \cdot S_A}{FSPL} \quad (9)$$

Where n is the number of aircraft within the main beam of the satellite antenna, $S_A$ is the radiated power spectral density of a single aircraft and the Free Space Path Loss (FSPL) in the linear domain.

By converting equation (9) into log domain, one obtains:

$$N_A[\text{dBW/Hz}] = 10 \log(n) + S_A[\text{dBW/Hz}] - \text{FSPL}_{dB} \quad (10)$$

Let $T_{dB}$ be a threshold value that specifies the difference between the power spectral densities of thermal noise and the interference caused by operating Spectrum Sharing System aircraft. In other words:

$$T_{dB} = N_0[\text{dBW/Hz}] - N_A[\text{dBW/Hz}] \quad (11)$$

By combining equations (10) and (11), one obtains the limit on transmit power spectrum density of a single aircraft:

$$S_A[\text{dBm/MHz}] = N_0[\text{dBW/Hz}] + \text{FSPL}_{dB} - 10 \log(n) - T_{dB} + 90 \quad (12)$$

Figure 2:
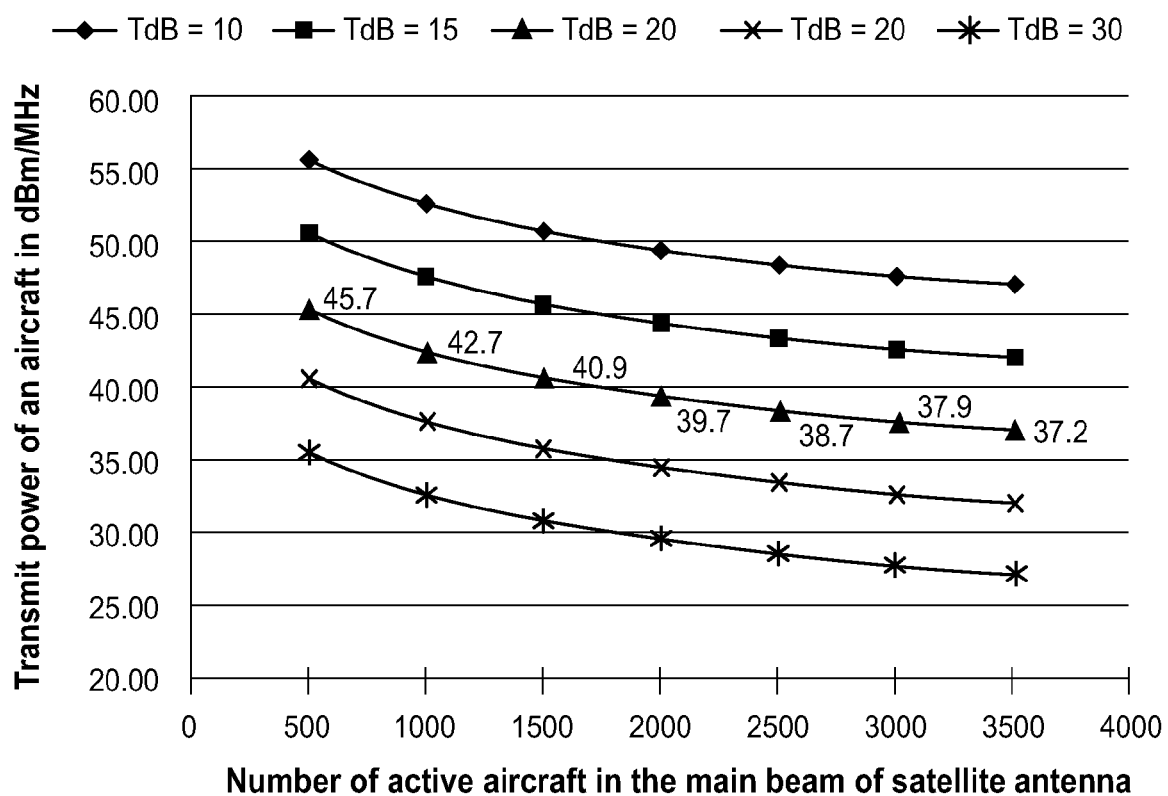
FIG. 2 illustrates, in graphical form, the limit on the aircraft transmit power spectral density in dBm [the power ratio in decibels (dB) of the measured power referenced to one milliwatt (mW)] per 1 MHz (megahertz) of allocated spectrum for the present Spectrum Sharing System, where the power is charted as a function of number of aircraft and desired level of protection for the geo-stationary satellite receivers.

Equation (12) is used to generate the family of curves presented in FIG. 2 which illustrates, in graphical form, the limit on the aircraft transmit power spectral density in dBm per 1 MHz of allocated spectrum for the present Spectrum Sharing System.

Use of the Curves in FIG. 2 is Illustrated Through a Simple Example

Consider a case when the Spectrum Sharing System is operating on 1,000 aircraft within the volume of space covered by the satellite receiver antenna. Assume that the protection threshold is set to $T_{add}$=20 dB, and that all of the aircraft are in the main beam of the satellite receiver antenna. According to FIG. 2, the transmission of each aircraft has a power spectral density limit of 43 dBm/MHz (20 Watts in 1 MHz bandwidth).

One point to note is that the presented analysis is on the worst case side. There are additional factors that would reduce the interference from the Spectrum Sharing System aircraft to the satellite receiver. Some of those factors, which were neglected in the analysis, may be listed as follows:

1. The analysis assumes that all of the aircraft are transmitting with the maximum power. In operational scenarios, the transmission of the aircraft is under power control and is always below the maximum value.
2. The analysis assumes that the EiRP of the aircraft is the same towards the serving cells on the ground and towards the satellite antenna. In practical implementation, it is reasonable to assume that the aircraft antenna directs most of the energy towards the ground, and the amount of radiation towards the sky would be significantly lower.
3. Only Free Space Path Losses are considered. In a practical scenario, additional losses due to atmospheric phenomena add to the attenuation of the aircraft-generated signal.

SUMMARY

Spectrum sharing between the Spectrum Sharing System and the Geostationary Satellite Service is possible. However, to make the sharing technically feasible, careful management of the interference between the Spectrum Sharing System ground station and the Geostationary Satellite Service earth station receiver side is required.

What is claimed as new and desired to be protected by Letters Patent of the United States is:

1. A system for providing wireless communication services to communication devices that are located in an aircraft that is operational in a selected coverage area, wherein at least one geostationary satellite communication system is operational in the selected coverage area and uses a plurality of earth stations, each of which transmit radio frequency signals in a narrow-shaped beam that is directed skyward, in a direction toward the equator of the earth, to a satellite at a first radio frequency and receive radio frequency signals from the satellite, at a second radio frequency, using the narrow-shaped beam that is directed skyward at the satellite, comprising:
   at least one ground station for creating a radio frequency coverage area that provides radio frequency links to aircraft that are operational in the radio frequency coverage area, comprising:
      a transmitter that generates a radio frequency signal at the second radio frequency for transmission to the aircraft; and
      an antenna that produces a broad-shaped beam of the radio frequency signal generated at the second radio frequency, which broad-shaped beam is directed skyward in a direction toward the equator of the earth and which substantially fails to radiate into any narrow-shaped beam of the earth stations of the geostationary satellite communication system.

2. The system for providing wireless communication services of claim 1 further comprising:
   wherein the aircraft uses the first radio frequency to transmit radio frequency signals to the ground station.

3. The system for providing wireless communication services of claim 2 wherein the at least one ground station comprises:
   a receiver which operates at the first radio frequency to receive radio frequency signals transmitted from an aircraft to the ground station.

4. The system for providing wireless communication services of claim 1 further comprising:
   wherein the antenna of the at least one ground station produces a broad-shaped beam that is directed skyward to avoid near-ground portions of the narrow-shaped beam of nearby earth stations.

5. The system for providing wireless communication services of claim 1 further comprising:
   wherein each ground station is located at sites which are outside of a path of the narrow-shaped beam.

6. A method for providing wireless communication services to wireless communication devices that are located in an aircraft that is operational in a selected coverage area, wherein at least one geostationary satellite communication system is operational in the selected coverage area and uses a plurality of earth stations, each of which transmit radio frequency signals in a narrow-shaped beam that is directed skyward, in a direction toward the equator of the earth, to a satellite at a first radio frequency and receive radio frequency signals from the satellite, at a second radio frequency, using the narrow-shaped beam that is directed skyward at the satellite, comprising:
   operating at least one ground station for creating a radio frequency coverage area that provides radio frequency links to aircraft that are operational in the radio frequency coverage area, comprising:
      generating a radio frequency signal at the second radio frequency for transmission to the aircraft; and
      operating an antenna to produce a broad-shaped beam of the radio frequency signal generated at the second radio frequency, which broad-shaped beam is directed skyward in a direction toward the equator of the earth and which substantially fails to radiate into any narrow-shaped beam of the earth stations of the geostationary satellite communication system.

7. The method for providing wireless communication services of claim 6 further comprising:
   wherein the aircraft uses the first radio frequency to transmit radio frequency signals to the ground station.

8. The method for providing wireless communication services of claim 6 further comprising:
   wherein the antenna of the at least one ground station produces a broad-shaped beam that is directed skyward to avoid near-ground portions of the narrow-shaped beam of nearby earth stations.

9. The method for providing wireless communication services of claim 6 wherein operating the at least one ground station comprises:
   operating a receiver at the first radio frequency to receive radio frequency signals transmitted from an aircraft to the ground station.

10. The method for providing wireless communication services of claim 6 further comprising:
    wherein each ground station is located at sites which are outside of a path of the narrow-shaped beam.

* * * * *

UNITED STATES PATENT AND TRADEMARK OFFICE
CERTIFICATE OF CORRECTION

PATENT NO.       : 8,442,519 B2
APPLICATION NO.  : 13/172539
DATED            : May 14, 2013
INVENTOR(S)      : Joseph M. Cruz et al.

Page 1 of 1

It is certified that error appears in the above-identified patent and that said Letters Patent is hereby corrected as shown below:

On the Title Page, Item (63) should be deleted as follows:

"Continuation-in-part of application No. 12/137,995, filed on Jun. 12, 2008, which is a continuation-in-part of application No. 11/492,545, filed on Jul. 24, 2006, now Pat. No. 7,751,815, which is a continuation of application No. 10/730,329, filed on Dec. 7, 2003, now Pat. No. 7,113,780, application No. 13/172,539, which is a continuation-in-part of application No. 12/423,555, filed on Apr. 14, 2009, now Pat. No. 8,073,443, which is a continuation of application No. 10/730,329, filed on Dec. 7, 2003, now Pat. No. 7,113,780."

Signed and Sealed this
Twenty-ninth Day of July, 2014

Michelle K. Lee
*Deputy Director of the United States Patent and Trademark Office*